(12) United States Patent
McNicol et al.

(10) Patent No.: US 7,672,595 B1
(45) Date of Patent: Mar. 2, 2010

(54) OPTICAL TRANSMISSION SYSTEM ARCHITECTURE SUPPORTING MIGRATION TO ELECTRONIC COMPENSATION OF LINK IMPAIRMENTS

(75) Inventors: John McNicol, Ottawa (CA); Maurice O'Sullivan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 601 days.

(21) Appl. No.: 10/742,808

(22) Filed: Dec. 23, 2003

(51) Int. Cl.
*H04B 10/12* (2006.01)
(52) U.S. Cl. .................. 398/147; 398/158; 398/192
(58) Field of Classification Search ............. 398/29, 398/81, 136, 147, 192
See application file for complete search history.

(56) References Cited

U.S. PATENT DOCUMENTS

| | | | | |
|---|---|---|---|---|
| 5,148,503 A | 9/1992 | Skeie | ............... | 385/3 |
| 5,311,346 A | 5/1994 | Haas et al. | ............... | 359/156 |
| 5,349,312 A | 9/1994 | Huettner et al. | | |
| 5,408,498 A | 4/1995 | Yoshida | ............... | 375/286 |
| 5,416,626 A | 5/1995 | Taylor | ............... | 359/156 |
| 5,430,568 A * | 7/1995 | Little et al. | ............... | 398/81 |
| 5,513,029 A | 4/1996 | Roberts | ............... | 359/177 |
| 5,579,328 A | 11/1996 | Habel et al. | ............... | 372/31 |
| 5,761,225 A | 6/1998 | Fidric et al. | ............... | 372/6 |
| 5,877,879 A * | 3/1999 | Naito | ............... | 398/91 |
| 5,892,858 A | 4/1999 | Vaziri et al. | ............... | 385/2 |
| 5,949,560 A | 9/1999 | Roberts et al. | ............... | 359/110 |
| 5,999,258 A | 12/1999 | Roberts | ............... | 356/345 |
| 6,067,180 A | 5/2000 | Roberts | ............... | 359/181 |
| 6,115,162 A | 9/2000 | Graves et al. | ............... | 359/173 |
| 6,124,960 A | 9/2000 | Garthe et al. | ............... | 359/181 |
| 6,128,111 A | 10/2000 | Roberts | ............... | 359/110 |
| 6,205,262 B1 | 3/2001 | Shen | ............... | 385/11 |
| 6,262,834 B1 | 7/2001 | Nichols et al. | ............... | 359/301 |
| 6,304,369 B1 | 10/2001 | Piehler | ............... | 359/337.4 |
| 6,441,932 B1 | 8/2002 | Helkey | ............... | 359/110 |
| 6,473,013 B1 | 10/2002 | Velazquez et al. | ............... | 341/120 |
| 6,559,994 B1 | 5/2003 | Chen et al. | ............... | 359/180 |
| 6,580,532 B1 | 6/2003 | Yao et al. | ............... | 359/111 |

(Continued)

FOREIGN PATENT DOCUMENTS

EP 0 524 758 1/1993

(Continued)

OTHER PUBLICATIONS

Adaptive Electronic Linearization of Fiber Optic Links, OFC 2003, vol. 2, pp. 477-480, Mar. 2003 Sadwani et al.

(Continued)

*Primary Examiner*—Dzung D Tran
(74) *Attorney, Agent, or Firm*—Ogilvy Renault LLP

(57) ABSTRACT

An optical communications system for conveying traffic through an optical link between transmitting and receiving nodes. The system comprises, for each node, respective legacy and bypass paths coupled in parallel between the optical link and the node. The legacy path of each node includes an optical dispersion compensation block for compensating a respective portion of dispersion of the link. Thus the present invention provides a system architecture by which an optical communications system can be constructed using conventional modulation and optical dispersion compensation technologies. Once installed, system growth can be accommodated using next generation transmitters (with electronic compensation) without stranding the legacy equipment. Legacy channels can also be upgraded to electronic compensation, as desired.

8 Claims, 2 Drawing Sheets

U.S. PATENT DOCUMENTS

| | | | |
|---|---|---|---|
| 7,058,311 B1* | 6/2006 | Islam et al. | 398/140 |
| 2002/0015207 A1* | 2/2002 | Ooi et al. | 359/161 |
| 2003/0011847 A1 | 1/2003 | Dai et al. | |
| 2004/0101236 A1* | 5/2004 | Kelly | 385/24 |

FOREIGN PATENT DOCUMENTS

| | | |
|---|---|---|
| EP | 1 237 307 | 9/2002 |
| WO | WO 02/43340 | 5/2002 |

OTHER PUBLICATIONS

Automated Measurement of Polarization Mode Dispersion Using Jones Matrix Eigenanalysis, IEE Photonics Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-714, Herraez et al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alfemess.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjuction, Journal of Lightwave Technology, vol. 14, No. 3, Mar. 1996, Watanabe et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Scott et al.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage. Date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 μm, Journal of Lightwave Technology, vol. 15, No. 9; Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Ligthwave Technology, vol. 15, No. 2, Feb. 1997, T. Iwai et al.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

Cancellation of Timing and Amplitude Jitter in Symmetric Links Using Highly Dispersed Pulses, IEEE Photonics Technology Letters, vol. 13, No. 5, May 2001, A. Meccozi et al.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

Sadhwani, Ram et al "Adaptive CMOS Predistortion Linearizer for Fiber-Optic Links", Journal of Lightwave Technology, Dec. 2003, pp. 3180-3193,vol. 21, No. 12., U.S.A.

Andre, P.S. et al "Extraction of DFB Laser Rate Equations Parameters for Optical Simulation Purposes", Conftele 99 ISBN 972-98115-0-4, pp. 561-564.

Illing, Lucas et at "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London. Date unknown.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4, 2000.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Direct Digital Synthesis Applications", GaAs IC Symposium, pp. 61-64, 1996.

Kamoto, T. et al "An 8-bit 2-ns Monolithic DAC", IEEE Journal of Solid-State Circuits, Feb. 1988, vol. 23, No. 1.

* cited by examiner

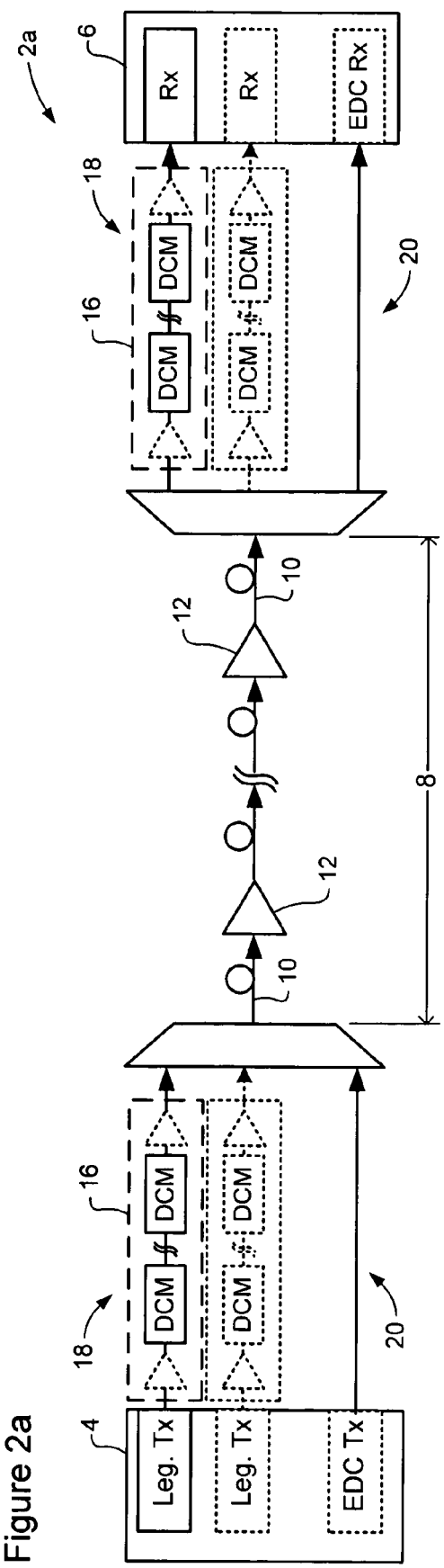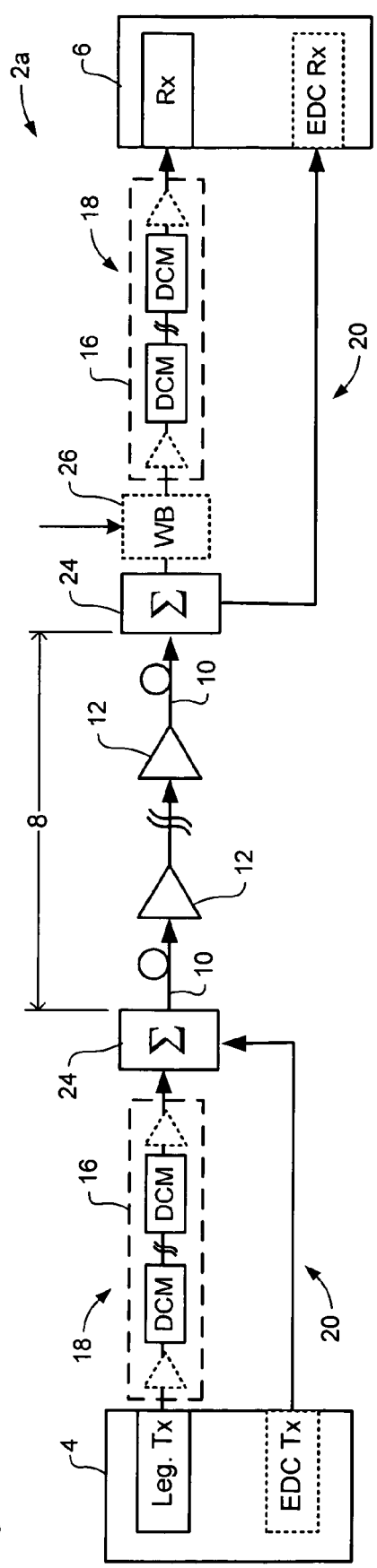

OPTICAL TRANSMISSION SYSTEM ARCHITECTURE SUPPORTING MIGRATION TO ELECTRONIC COMPENSATION OF LINK IMPAIRMENTS

CROSS-REFERENCE TO RELATED APPLICATIONS

This is the first application filed for the present invention.

MICROFICHE APPENDIX

Not Applicable.

TECHNICAL FIELD

The present application relates to optical transmission systems, and in particular to an optical transmission system architecture supporting migration to electronic compensation of link impairments.

BACKGROUND OF THE INVENTION

Optical communications systems typically include a pair of network nodes connected by an optical waveguide (i.e., fiber) link. For the purposes of illustration, FIG. 1a presents a simplified view of an optical communications system 2 comprising a transmitting node 4, and a receiving node 6 coupled together by a multi-span optical link 8. Within the end nodes 4 and 6, communications signals are converted into electrical signals for signal regeneration and/or routing, and converted into optical signals for transmission through the optical link to the other node. The optical link 8 between the network nodes is typically made up of multiple concatenated optical components, including one or more (and possibly 20 or more) optical fiber spans 10 (e.g., of 40-150 km in length) interconnected by optical nodes 11, each of which typically includes at least one optical amplifier 12. An optical node 11 may, for example, include an optical add-drop multiplexer (OADM) and/or other optical signal processing devices.

The use of concatenated optical components within a link enables improved signal reach (that is, the distance that an optical signal can be conveyed before being reconverted into electrical form for regeneration). Thus, for example, optical signals are progressively attenuated as they propagate through a span 10, and amplified by an optical amplifier 12 (e.g., an Erbium Doped Fiber Amplifier—EDFA) within a node 11, prior to being launched into the next span 10. However, signal degradation due to noise and dispersion effects increase as the signal propagates through the fiber. Consequently, noise and dispersion degradation become significant limiting factors of the maximum possible signal reach.

One commonly used method of addressing the problem of dispersion in high-bandwidth communications systems is by inserting one or more optical dispersion compensator modules (DCMs) 14 within each node 11 of the link 8. Such dispersion compensators may, for example, take the form of a length of fibre, a Mach Zehnder interferometer, an optical resonator, or a Bragg reflector. Some known compensators can also produce a controllable amount of compensation, which enables mitigation of time-variant dispersion effects. In either case, these compensators are intended to offset the signal distortions introduced by dispersion.

Typically, optical dispersion compensator modules (DCMs) 14 are provided at regular intervals across the link 8. For example, a respective DCM 14 may be co-located with each optical node 11, as shown in FIG. 1a. With this arrangement, each DCM 14 operates to mitigate dispersion of only its respective (upstream) span 10. This enables each DCM 14 to be optimized for each span 10, with a corresponding optimization of total dispersion compensation performance.

It is also known to provide "lumped" dispersion compensation, by installing one of more DCM blocks 16 at opposite ends of the link 8, as shown in FIG. 1b. Each DCM block 16 includes one or more DCMs 14, and may also include one or more optical amplifiers 12a to offset losses due to the DCMs 14. Theoretically at least, the arrangement of FIG. 1b should provide dispersion compensation substantially equivalent to that of FIG. 1a. However, as described in "*Cancellation of Timing and Amplitude Jitter in Symmetric Links Using Highly Dispersed Pulses*", Mecozzi et al., IEEE Photonics Technology Letters, Col. 13, No. 5, May 2001, when the dispersion compensation is evenly divided between the transmit and receive ends of the link 8, cancellation of timing and amplitude jitter yields improved link performance.

Applicant's co-pending U.S. patent application Ser. Nos. 10/262,944, filed Oct. 3, 2002; 10/307,466 filed Dec. 2, 2002; and 10/405,236 filed Apr. 3, 2003; and International Patent Application No. PCT/CA03/01044 filed Jul. 11, 2003 describe techniques for compensating impairments in an optical link by predistorting an input signal, in the electrical domain, and then using the thus predistorted signal to drive an optical modulator. Because compensation is implemented in the electrical domain, virtually any arbitrary compensation function can be implemented. This enables dispersion (and other link impairments) to be compensated, without requiring optical DCMs 14 within the link 8. Elimination of DCMs has the additional advantage that it reduces the system gain required to obtain a desired signal reach, thereby enabling fewer (or lower performance) amplifiers 12. Furthermore, electrical domain compensation facilitates system evolution, because changes in link equipment and/or performance parameters can readily be accommodated through suitable adjustment of the compensation function.

However, a limitation of the above approach is that the cost of modifying an existing link to exploit the advantages of electrical precompensation may create a potential cost barrier. In particular, deployment of electrical domain compensation for any one wavelength channel involves removal (or bypassing) of any DCMs within the link, in addition to the installation of the new channel transmitter. However, legacy channels still require the presence of the DCMs. Addressing this difficulty requires that either: all of the channels must be converted to electronic compensation at once; or, in the alternative, wavelength-selective bypasses must be provided at each DCM. Both options are expected to be expensive, and may deter migration of installed optical communications systems to electrical domain compensation.

While electrical domain compensation (EDC) shows great promise, practical EDC transmitter and receiver systems are not yet commercially available. However, new optical links are still being deployed. Obviously, such links are provisioned using existing DCM technology. It would be desirable to design new links such that they can be cost-effectively converted to electrical domain compensation when EDC transmitter and receiver systems become available, without unduly increasing the cost of the link.

An optical transmission system architecture which enables progressive migration from conventional optical dispersion compensation to electronic compensation of link impairments would be highly desirable.

SUMMARY OF THE INVENTION

An object of the present invention is to provide an optical transmission system which simultaneously supports legacy and electronically compensated traffic.

Accordingly, an aspect of the present invention provides an optical communications system for conveying traffic through an optical link between transmitting and receiving nodes. The system comprises, for each node, respective legacy and bypass paths coupled in parallel between the optical link and the node. The legacy path of each node includes an optical dispersion compensation block for compensating a respective portion of dispersion of the link.

Thus, by means of the present invention, the conventionally distributed optical compensation functionality is aggregated at each end of the link. This enables legacy traffic to traverse the link with satisfactory dispersion compensation performance. Respective optical bypasses connected in parallel with the DCMs convey electronically compensated traffic. With this arrangement, the electronically compensated traffic can co-exist with legacy traffic traversing the link.

BRIEF DESCRIPTION OF THE DRAWINGS

Further features and advantages of the present invention will become apparent from the following detailed description, taken in combination with the appended drawings, in which:

FIGS. 2a and 2b schematically illustrate an optical communications system in accordance with respective embodiments of the present invention;

It will be noted that throughout the appended drawings, like features are identified by like reference numerals.

DETAILED DESCRIPTION OF THE PREFERRED EMBODIMENT

Figure 1A:
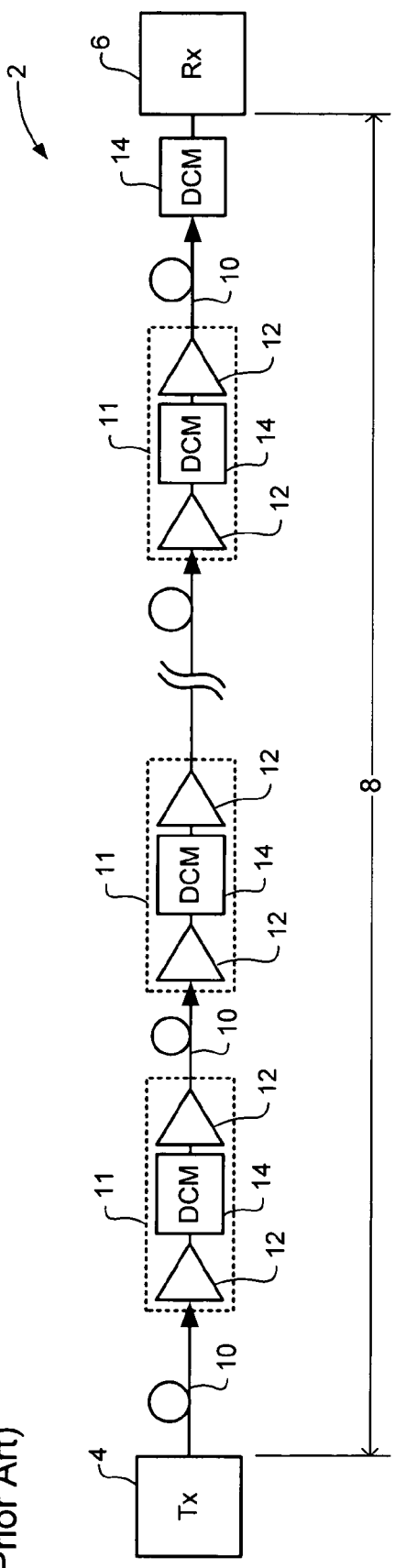
FIGS. 1a and 1b schematically illustrate respective conventional optical communications systems.

The present invention provides an optical transmission system which simultaneously supports legacy and electronically compensated optical signal traffic. This functionality enables a progressive migration of wavelength channels from legacy transmission equipment to next generation transmitters with electronic compensation of link impairments. Thus the present invention provides a system architecture by which an optical communications system can be constructed using conventional modulation and optical dispersion compensation technologies. Once installed, system growth can be accommodated using next generation transmitters (with electronic compensation) without stranding the legacy equipment. Legacy channels can also be upgraded to electronic compensation, as desired. Features of the present invention are described below with reference to FIGS. 2a and 2b.

As shown in FIG. 2a, an optical communications system 2a in accordance with the present invention utilizes legacy and bypass optical paths 18 and 20 coupled in parallel between each node and the optical link 8. The legacy optical path 18 conveys legacy optical signal traffic, and provides lumped optical dispersion compensation. The bypass optical path 20 carries next generation electrically compensated signal traffic.

The optical bypass 20 generally comprises an optical fiber path connected in parallel with the DCMs of the legacy path.

Figure 1B:
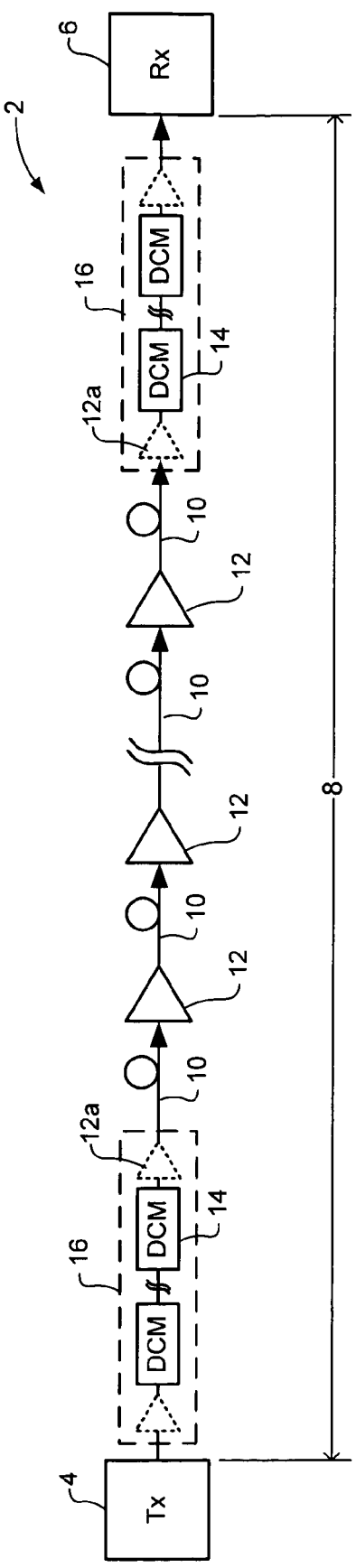

The lumped optical dispersion compensation functionality can be provided by means of one or more optical dispersion compensator (DCM) blocks 16 disposed proximal each node, in the manner described above with reference to FIG. 1b. As will be appreciated, the use of DCM blocks 16 in this manner enables legacy optical signal traffic to traverse the link 8 with acceptable dispersion compensation. If desired, the legacy path 18 may include a plurality of parallel DCM blocks 16, as shown in FIG. 2a. In this case, each DCM block 16 carries legacy optical signal traffic within a respective desired wavelength band. This arrangement reduces the bandwidth requirement of each DCM block 16, and therefore reduces the cost of the DCMs 14 within each DCM block 16.

Various methods known in the art may be used to couple the legacy and bypass optical paths 18 and 20 to the link 8. For example, as shown in FIG. 2a, a conventional optical multiplexer (MUX) 22 may be used to divide composite WDM signal traffic traversing the link 8 into legacy and successor channel bands (not shown). Traffic within the legacy channel band is routed through the legacy optical path 18, while traffic within the successor channel band is routed through the bypass path 20. As may be appreciated, the legacy and successor channel bands may be of any suitable width to encompass desired wavelength channels. Furthermore, the legacy and successor channel bands need not be contiguous. In particular, in cases where the MUX 22 is capable of demultiplexing individual channels from the composite WDM signal, each channel may be individually routed through a selected one of the legacy and bypass paths 18 and 20.

FIG. 2b illustrates an embodiment in which the legacy and bypass paths 18 and 20 are coupled to the link 8 via conventional broadband signal combiners 24. In this case, a wavelength blocker 26 may optionally be used to selectively block wavelengths traversing the legacy and/or the bypass paths 18 and 20. For example, a wavelength blocker 26 located in the legacy path 18 (as shown in FIG. 2b) may be used to block wavelength channels conveying electronically precompensated signal traffic. Similarly, a wavelength blocker 26 located in the bypass path 20 (not shown) may be used to block wavelength channels conveying legacy signal traffic.

As will be appreciated, the use of lumped dispersion compensation for legacy traffic means that, at some point within the optical link 8, total dispersion of the legacy signals will be at a minimum (nominally zero). The location of this so-called "zero-dispersion" point will be a function of the proportion of the total link dispersion that is compensated by each of the compensator blocks 16. For example, an even distribution of dispersion compensation between opposite ends of the link, as described in *Cancellation of Timing and Amplitude Jitter in Symmetric Links Using Highly Dispersed Pulses*" (Supra), would result in the zero dispersion point being located at about the mid-point of the optical link. Varying the distribution of dispersion compensation between the two ends yields corresponding changes in the location of the zero-dispersion point (with some loss of system performance due to timing jitter). Thus, it is possible to position the zero-dispersion point at a desired location within the optical link 8, by designing the legacy path DCM block 16 to compensate a suitable proportion of the total link dispersion.

The ability to control the location of the zero-dispersion point is useful because it enables an optical add-drop multiplexer (OADM) to be inserted into the link 8, without requiring the provisioning of any additional optical dispersion compensation modules. Obviously, this advantage is specific to the legacy signal traffic traversing the link. Electronically compensated signal traffic can be synthesized, at the transmitter, to obtain zero total dispersion at any arbitrary location within the link. Legacy signal traffic, on the other hand, is limited by the performance of the link and the DCMs. Thus the legacy signal traffic will exhibit some total dispersion, which is driven by the link and DCM performance, and which will be non-zero at every location except the zero-dispersion point. Consequently, if it is desired to Add/drop legacy channels at a particular location within the link, additional DCMs will normally have to be provided to compensate the dispersion exhibited by those channels at that point. The ability to select the position of the zero-dispersion point, as described above, relieves this problem, at least in cases where there is only one OADM within the link.

The embodiment(s) of the invention described above is (are) intended to be exemplary only. The scope of the invention is therefore intended to be limited solely by the scope of the appended claims.

We claim:

1. An optical communications system for conveying traffic through an optical link between transmitting and receiving nodes, the system comprising, for each node, respective legacy and bypass paths coupled in parallel between the optical link and the node,
   wherein the legacy path is coupled to a legacy optical transmitter that is not capable of electrical domain compensation of dispersion of the link, and includes at least one optical dispersion compensation block for compensating at least a portion of the dispersion, the legacy path having no electrical domain compensation; and
   wherein the bypass path is coupled to a successor optical transmitter capable of electrical domain dispersion compensation, the bypass path having electrical domain compensation,
   the optical communications system further comprising a broadband signal combiner for coupling respective legacy and bypass paths to the optical link, the signal combiner being operative to divide optical energy traversing the link between the legacy and bypass paths and a wavelength blocker coupled in the legacy path for selectively blocking one or more wavelength channels traversing the legacy path.

2. A system as claimed in claim 1, wherein a proportion of dispersion compensated by each compensation block is selected such that a zero-dispersion point is proximal to a desired position within the link.

3. A system as claimed in claim 2, further comprising an Optical Add-Drop Multiplexer (OADM) disposed proximal the zero-dispersion point.

4. A system as claimed in claim 2, wherein the zero-dispersion point is proximal to a mid-point of the link.

5. A system as claimed in claim 1, further comprising an optical multiplexer/demultiplexer (MUX) for coupling respective legacy and bypass paths to the optical link, the MUX being operative to separate composite WDM traffic within the link into corresponding legacy and successor channel bands respectively conveyed through the legacy and bypass paths.

6. A system as claimed in claim 5, wherein each of the legacy and successor channel bands are contiguous.

7. A system as claimed in claim 5, wherein each of the legacy and successor channel bands are non-contiguous.

8. A system as claimed in claim 1, further comprising a wavelength blocker coupled in the bypass path, for selectively blocking one or more wavelength channels traversing the bypass path.

* * * * *